(12) United States Patent
Ko et al.

(10) Patent No.: US 10,212,646 B2
(45) Date of Patent: Feb. 19, 2019

(54) METHOD FOR CELL DISCOVERY

(71) Applicant: Electronics and Telecommunications Research Institute, Daejeon (KR)

(72) Inventors: Young Jo Ko, Daejeon (KR); Jae Young Ahn, Daejeon (KR); Bangwon Seo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 21 days.

(21) Appl. No.: 14/763,092

(22) PCT Filed: Jan. 24, 2014

(86) PCT No.: PCT/KR2014/000695
§ 371 (c)(1),
(2) Date: Jul. 23, 2015

(87) PCT Pub. No.: WO2014/116050
PCT Pub. Date: Jul. 31, 2014

(65) Prior Publication Data
US 2015/0358899 A1  Dec. 10, 2015

(30) Foreign Application Priority Data

Jan. 25, 2013 (KR) .................. 10-2013-0008903
Jul. 1, 2013 (KR) .................. 10-2013-0076533
Jan. 24, 2014 (KR) .................. 10-2014-0008665

(51) Int. Cl.
*H04L 12/26* (2006.01)
*H04W 48/16* (2009.01)
*H04W 24/08* (2009.01)
*H04W 72/04* (2009.01)
*H04W 56/00* (2009.01)
(Continued)

(52) U.S. Cl.
CPC .......... *H04W 48/16* (2013.01); *H04W 24/08* (2013.01); *H04W 48/12* (2013.01); *H04W 56/00* (2013.01); *H04W 72/042* (2013.01); *H04J 2211/001* (2013.01); *H04W 84/045* (2013.01)

(58) Field of Classification Search
None
See application file for complete search history.

(56) References Cited

U.S. PATENT DOCUMENTS

| 2009/0097452 A1 | 4/2009 | Gogic |
| 2011/0151859 A1 | 6/2011 | Lee et al. |
| 2012/0046033 A1 | 2/2012 | Ko et al. |

(Continued)

FOREIGN PATENT DOCUMENTS

| JP | 2011259194 A | 12/2011 |
| KR | 1020100117522 A | 11/2010 |

(Continued)

*Primary Examiner* — Willie J Daniel, Jr.
(74) *Attorney, Agent, or Firm* — William Park & Associates Ltd.

(57) ABSTRACT

Disclosed is a method for cell discovery. In a network in which a macro cell overlaps at least one small cell, when the carrier frequency used by the macro cell is different from the carrier frequency used by the small cell, the small cell transmits a discovery signal using the carrier frequency used by the macro cell, or the small cell transmits a discovery signal using a carrier frequency of the small cell that is different from the carrier frequency used by the macro cell.

8 Claims, 14 Drawing Sheets

(51) Int. Cl.
*H04W 48/12* (2009.01)
*H04W 84/04* (2009.01)

(56) References Cited

U.S. PATENT DOCUMENTS

| | | | |
|---|---|---|---|
| 2012/0287875 A1 | 11/2012 | Kim et al. | |
| 2013/0077507 A1 | 3/2013 | Yu et al. | |
| 2014/0056220 A1* | 2/2014 | Poitau | H04W 40/246 370/328 |
| 2015/0181543 A1* | 6/2015 | Hwang | H04W 56/002 370/336 |
| 2015/0195770 A1* | 7/2015 | Sun | H04J 1/08 370/330 |
| 2015/0327046 A1* | 11/2015 | Lee | H04W 56/002 370/338 |

FOREIGN PATENT DOCUMENTS

| | | |
|---|---|---|
| KR | 1020110028656 A | 3/2011 |
| KR | 1020110073251 A | 6/2011 |
| KR | 1020120007997 A | 1/2012 |
| KR | 1020120115575 A | 10/2012 |
| WO | 2009142954 A1 | 11/2009 |
| WO | 2010005612 A1 | 1/2010 |

\* cited by examiner

| CELL STATE | WHETHER TO TRANSMIT CELL DISCOVERY SIGNAL |
|---|---|
| Dormant_0 | NO TRANSMISSION |
| Dormant_1 | TRANSMISSION |
| Active_0 | NO TRANSMISSION |
| Active_1 | TRANSMISSION |

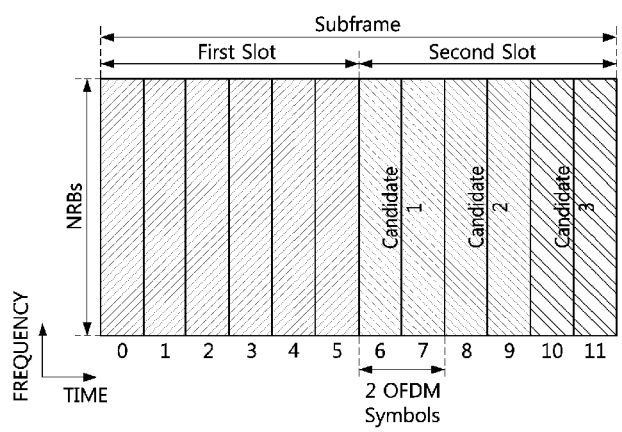

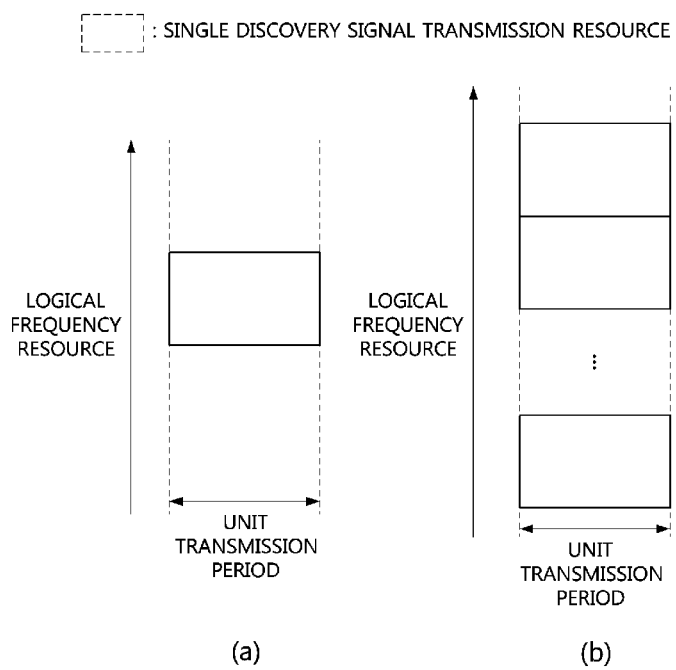

FIG. 20
[RESOURCE CONFIGURATION OF TRANSMISSION POINT A]
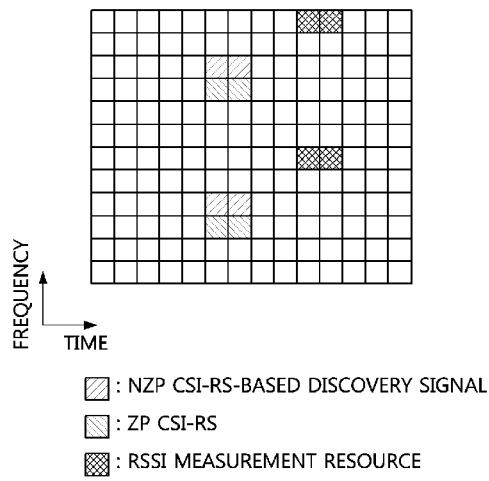
◪ : NZP CSI-RS-BASED DISCOVERY SIGNAL
◩ : ZP CSI-RS
▦ : RSSI MEASUREMENT RESOURCE
[RESOURCE CONFIGURATION OF TRANSMISSION POINT B]
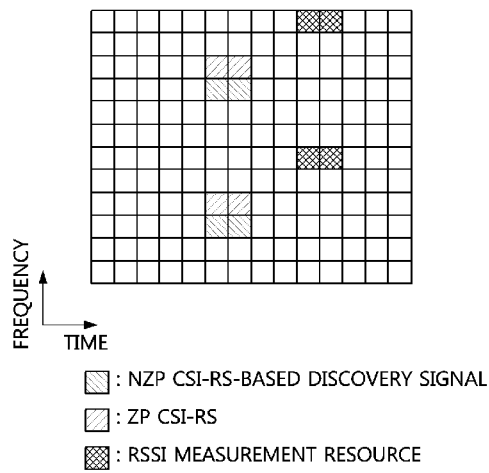
◩ : NZP CSI-RS-BASED DISCOVERY SIGNAL
◪ : ZP CSI-RS
▦ : RSSI MEASUREMENT RESOURCE

METHOD FOR CELL DISCOVERY

TECHNICAL FIELD

The present invention relates to mobile communication technology, and more particularly, to a cell discovery method.

BACKGROUND ART

Due to widespread dissemination of a mobile terminal and a tablet personal computer (PC) which are portable and rapid expansion of mobile computing based on wireless Internet technology, an epoch-making increase of a wireless network capacity is needed.

It has been estimated that traffic usage of mobile users will be abruptly increased in the future in many studies. A method of applying advanced physical layer technology or allocating an additional spectrum may be considered as a representative solution for satisfying a requirement according to the abrupt traffic increase. However, the physical layer technology is reaching a theoretical limit point and a capacity increase of a cellular network through allocation of an additional spectrum cannot become a basic solution.

Accordingly, demand for technologies of arranging small cells in multiple layers in a location in which much data is required and increasing a capacity of a wireless network through close cooperation between a macro base station and a small cell base station is being increased.

A standardization with respect to technology for small cell enhancement is being carried out in order to effectively accommodate demand for data traffic of rapidly increasing in a standardization meeting of a long term evolution (LTE)-advanced of a third generation partnership project (3GPP).

There are spectrum efficiency improvement technology, activation/deactivation of a small cell and cell discovery technology, interference control technology, wireless interface-based synchronization technology, physical layer technology for support of upper layer small cell improvement technology, etc. in technologies under consideration for the small cell enhancement. Particularly, a discovery method, a discovery signal, a discovery process, etc. are being discussed as the cell discovery technology.

However, to the present, only a discussion for the cell discovery is being performed, and a detailed and efficient method for the cell discovery is not being proposed.

DISCLOSURE

Technical Problem

The present invention is directed to providing an efficient cell discovery method which can be applied to a cellular mobile communication system.

Technical Solution

One aspect of the present invention provides a cell discovery method of a small cell in a network in which a macro cell and at least one small cell are arranged to overlap, wherein, when a carrier frequency used by the macro cell and a carrier frequency used by the small cell are different, the small cell transmits a discovery signal using the carrier frequency in which the macro cell uses.

Here, a location of a frequency domain of a resource in which the discovery signal is transmitted may correspond to resource blocks in which the number of the resource blocks is equal to or less than 6 located in the middle of a transmission band of the macro cell. Further, a location of a subframe in which the discovery signal is transmitted may be equal to that of a subframe in which a cell search signal is transmitted.

Here, the resource in which the discovery signal is transmitted may be two symbols which are temporally adjacent among symbols in which a cell-specific reference signal (CRS), a primary synchronization signal (PSS), a secondary synchronization signal (SSS), and a physical broadcast channel (PBCH) are not transmitted in a subframe in which the discovery signal is transmitted.

Here, the discovery signal may be composed of a primary discovery signal and a secondary discovery signal, and the primary discovery signal and the secondary discovery signal may be transmitted through different symbols. Here, a sequence of the primary discovery signal may be generated using a Zadoff-Chu sequence of a frequency domain, and be generated using a root index value different from a root index applied to a PSS. Here, a sequence of the secondary discovery signal may be generated by configuring a relation between scrambling sequences $c_0(n)$, $c_1(n)$ and a physical-layer identity $N_{ID}^{(2)}$ unlike an SSS sequence, or configuring a relation between a physical layer cell ID group and parameters $m_0$ and $m_1$ unlike the SSS sequence.

Another aspect of the present invention provides a cell discovery method of a small cell in a network in which a macro cell and at least one small cell are arranged to overlap, wherein, the small cell transmits a discovery signal using a carrier frequency of the small cell which is different from a carrier frequency in which the macro cell uses.

Here, when the small cell is in a dormant state, the small cell may transmit the discovery signal using two symbols which are temporally adjacent among symbols in which a physical downlink control channel (PDCCH), a primary synchronization signal (PSS), a secondary synchronization signal (SSS), and a physical broadcast channel (PBCH) in which peripheral small cells use in a subframe in which the discovery signal is transmitted are not transmitted.

Here, when the small cell is in an active state, the small cell may transmit the discovery signal using symbols which are different from a symbol in which other cells which are adjacent use for transmitting the discovery signal.

Still another aspect of the present invention provides a cell discovery method applied to a network in which cells having different sizes are arranged to overlap, the cell discovery method, including: configuring a discovery signal using a channel state information reference signal (CSI-RS) corresponding to a predetermined number of antenna ports by at least one cell; and transmitting resource configuration information of the discovery signal to a terminal.

Here, the configuring of the discovery signal may configure the discovery signal using one antenna port in one subframe by one cell, and the one antenna port may correspond to a CSI-RS resource with respect to four antenna ports.

Here, the transmitting of the resource configuration information of the discovery signal to the terminal may include at least one among sequence configuration information of the discovery signal, subframe configuration information, and resource information in which the discovery signal is transmitted in a subframe.

Here, a resource of the discovery signal may be differently configured for each discovery signal, be equally configured for every discovery signal, or be differently configured for each classified discovery signal group.

Yet another aspect of the present invention provides a cell discovery method applied to a network in which cells having different sizes are arranged to overlap, the cell discovery method, including: configuring a discovery hopping process configured as subframes having a predetermined subframe interval; and determining a resource of time and frequency domain in which a discovery signal is transmitted in the configured discovery hopping process.

Here, the determining of the resource of the time and frequency domain may determine so as to transmit only one discovery signal in one unit transmission time, or so as to transmit a plurality of discovery signals using different frequency resources in one unit transmission time.

Here, the determining of the resource of the time and frequency domain may cause a predetermined row of a Latin square matrix to correspond to a time domain resource of the discovery signal, and determine a time and frequency domain resource of the discovery signal by causing a predetermined Latin square matrix among a plurality of different Latin square matrixes to correspond to the frequency domain resource.

Here, the determining of the resource of the time and frequency domain may arrange by distributing a plurality of resources configuring the discovery signal in the frequency domain.

Yet another aspect of the present invention provides a cell discovery method performed in a terminal, the cell discovery method, including: receiving a resource and sequence information of a discovery signal from a base station; measuring the discovery signal corresponding to a measurement target discovery resource and a sequence based on the received information; and reporting the measurement result to the base station.

Here, the measuring of the discovery signal may measure at least one of a received signal strength indicator (RSSI) of the discovery signal, a reference signal received power (RSRP) of the discovery signal, and a reference signal received quality (RSRQ) of the discovery signal.

Advantageous Effects

According to the cell discovery method described above, the cell discovery signal design method based on the synchronization signal, the cell discovery signal design method based on the channel state information-reference signal (CSI-RS), the reception and transmission resource configuration method of the cell discovery signal, the resource and sequence allocation method of the cell discovery signal, the reception, measurement, report method of the cell discovery signal, and the terminal discovery method by the cell are provided in detail.

Accordingly, the cell discovery can be effectively performed in the cellular mobile communication system.

DESCRIPTION OF DRAWINGS

FIG. 9 illustrates a method of transmitting a discovery signal using a fifth subframe in a subframe structure having an extended CP.

FIG. 10 illustrates a root sequence index with respect a primary discovery signal.

FIG. 13 is a conceptual diagram illustrating a frequency domain resource mapping method of a discovery signal.

FIG. 14 illustrates an example of a 4×4 Latin square matrix.

FIG. 20 is a conceptual diagram for describing a method of configuring a resource for transmission of a CSI-RS-based discovery signal and an RSSI measurement resource.

MODES OF THE INVENTION

Figures 1, 2:
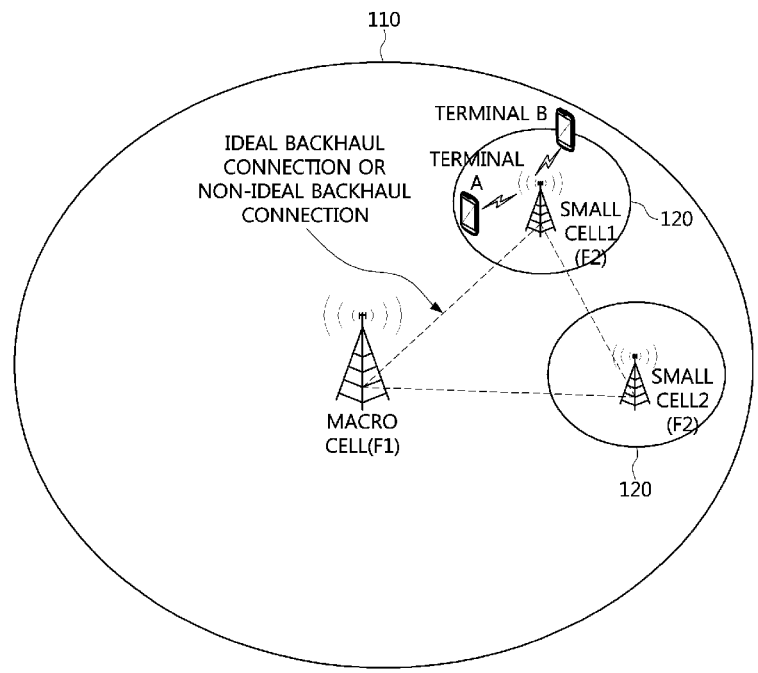
FIG. 1 illustrates a state of a cell and whether to transmit a discovery signal in a viewpoint of cell discovery.
FIG. 2 is a conceptual diagram illustrating a case in which small cells are arranged within coverage of a macro cell.

While the invention is susceptible to various modifications and alternative forms, specific embodiments thereof are shown by way of examples in the drawings and will herein be described in detail.

It should be understood, however, that there is no intent to limit the invention to the particular forms disclosed, but on the contrary, the invention is to cover all modifications, equivalents, and alternatives falling within the spirit and scope of the invention.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A "terminal" used herein may be referred to as a mobile station (MS), a mobile terminal (MT), a user device, a user equipment (UE), a user terminal (UT), a wireless terminal, an access terminal (AT), a subscriber unit, a subscriber station (SS), a wireless device, a wireless communication device, a wireless transmit/receive unit (WTRU), a mobile node, a mobile or other terminologies.

Further, generally, a "base station" used herein may be a fixed point communicating with a terminal, and may be referred to as another terminology such as a base station, a node-B, an evolved node-B (eNode-B), a base transceiver system (BTS), and an access point, etc.

Further, a "transmission point" used herein may include at least one transmission and reception antenna, be a transmission and reception device connected to a base station through an optical fiber, a microwave, etc. and capable of transmitting and receiving information with the base station, and include a remote radio head (RRH), a remote radio unit (RRU), a distributed antenna, etc. The base station may be included in the transmission point.

Further, exemplary embodiments of the inventive concept which will be described hereinafter may be supported by standard documents disclosed in at least one among an Institute of Electrical and Electronics Engineers (IEEE) 802 system, a 3rd Generation Partnership Project (3GPP) system, a 3GPP long term evolution (LTE) system, and a 3GPP2 system which are wireless access systems. That is, steps or portions which are not described to disclose a technical spirit of the inventive concept clearly may be supported by the standard documents described above. Further, every terminology used herein may be described by the standard documents.

Hereinafter, exemplary embodiments of the inventive concept will be described in detail with reference to the accompanying drawings. In order to facilitate a comprehensive understanding in the following description, like numbers refer to like elements in the drawings, and duplicated descriptions will be omitted with respect to the like elements.

Cell Discovery

Discovery Signal

Cell discovery may mean a process in which a terminal receives a discovery signal in which a cell transmits and discovers whether there is a cell. Here, the cell discovery signal may mean a physical channel or a physical signal in which the cell transmits for the cell discovery. The cell discovery signal may be used for transmitting a cell identity (ID) or information including cell index information, cell state information, etc.

Terminal discovery (UE discovery) may mean a process in which a base station receives a terminal discovery signal in which a terminal transmits and discovers whether there is a terminal. Here, the terminal discovery signal may mean a physical channel or a physical signal in which the terminal transmits for the discovery. The base station may obtain information including a serving cell of a terminal, a terminal scheduling ID, etc. from the terminal discovery signal and estimate a proximity degree of the terminal.

FIG. 1 illustrates a state of a cell and whether to transmit a discovery signal in a viewpoint of cell discovery.

Referring to FIG. 1, a cell which is in a Dormant_0 state may not transmit any signal. A cell which is in a Dormant_1 state may periodically transmit its own cell discovery signal and may not transmit any signal besides it. A cell which is in an Active_0 state may transmit various types of physical signals and channels needed for operating as a cell, but may not transmit its own cell discovery signal. A cell which is in an Active_1 state may transmit various types of physical signals and channels needed for operating as a cell, and may periodically transmit its own cell discovery signal.

Method of Transmitting a Discovery Signal According to a Discovery Signal Transmission Frequency FIG. 2 is a conceptual diagram illustrating a case in which small cells are arranged within coverage of a macro cell.

In FIG. 2, suppose that a carrier frequency used by a macro cell 110 is F1, and a carrier frequency in which small cells 120 use is F2. An ideal backhaul or a non-ideal backhaul may be formed between the macro cell 110 and the small cells 120 and between the small cell 120 and the small cell 120.

The discovery signal may be designed by classifying into the following two scenarios according to whether the macro cell 110 and the small cell 120 use the same carrier frequency.

[Scenario 1] the macro cell 110 and the small cell 120 use different carrier frequencies (F1≠F2)

[Scenario 2] the macro cell 110 and the small cell 120 use the same carrier frequency (F1≠F2)

In the dormant state, the small cell 120 may transmit the discovery signal. Meanwhile, in the active state, the following two discovery signal transmission methods may be considered according to whether to transmit the discovery signal.

[Method 1] when the small cell 120 is in the active state, the small cell 120 may not transmit the discovery signal.

[Method 2] even when the small cell 120 is in the active state, the small cell 120 may transmit the discovery signal.

Further, the following two discovery signal transmission methods may be considered according to a carrier frequency used by the small cell 120 in order to transmit the discovery signal.

[Method 1] the small cell 120 may transmit the discovery signal using the carrier frequency F1 in which the macro cell 110 uses.

[Method 2] the small cell 120 may transmit the discovery signal using the carrier frequency F2 allocated to its own.

Cell Discovery Signal Design Method Based on a Synchronization Signal

When the Macro Cell and the Small Cell Use Different Carrier Frequencies (F1≠F2)

When the macro cell and the small cells are arranged as shown in FIG. 2, a cell discovery method may be considered by classifying into a case in which the macro cell operates as a frequency division duplex (FDD) method and a case in which the macro cell operates as a time division duplex (TDD) method.

First, the case in which the macro cell operates as the FDD method will be described.

The following two discovery signal transmission methods may be considered according to a carrier frequency used by the small cell 120 in order to transmit the discovery signal.

[Method 1] the small cell 120 may transmit the discovery signal using the carrier frequency F1 in which the macro cell 110 uses.

[Method 2] the small cell 120 may transmit the discovery signal using the carrier frequency F2 allocated to its own.

Case in which a Small Cell Transmits a Discovery Signal Using a Carrier Frequency F1 of a Macro Cell A location in a frequency domain and a location in a time domain of a wireless resource in which the discovery signal is transmitted should be determined so that the small cell transmits the discovery signal using the carrier frequency of the macro cell.

A Location in the Frequency Domain of the Wireless Resource in which the Discovery Signal is Transmitted A resource using for transmission of the discovery signal may be desirable to be included in resource blocks (RBs) which are located in the middle of a transmission bandwidth of the cell and in which the number of the resource blocks are equal to or less than 6. As such, when allocating the resource, there is an advantage capable of using the same resource allocation to the discovery signal regardless of the transmission bandwidth of the cell. Complexity of the discovery signal detection of the terminal may be decreased since the terminal can detect the discovery signal by supposing the same resource allocation regardless of the transmission bandwidth of the cell.

As prescribed in 3GPP LTE standard Release-8/9/10/11, a primary synchronization signal (PSS) and a secondary synchronization signal (SSS) which are cell search signals may be transmitted using six resource blocks (RBs) located in the middle of the transmission bandwidth of the cell. Here, the discovery signal may be used for the cell search instead of the cell search signals, and when using the same frequency domain as the cell search signals, there may be an advantage in which it is easy for the terminal to detect both the discovery signal and the cell search signals. That is, locations of the resource blocks (RBs) in which the discovery signal is transmitted may be equal to those of the resource blocks (RBs) in which the PSS and the SSS are transmitted, and the discovery signal may be transmitted using the six resource blocks (RBs) located in the middle of the transmission bandwidth.

The location of the frequency domain in which the discovery signal is transmitted may be detected using a method which is previously prescribed in a standard, or a method in which the macro cell base station informs the terminal through a radio resource control (RRC) signaling.

A Location of a Subframe in which a Discovery Signal is Transmitted

A location of a subframe in which the discovery signal is transmitted, a time location in the subframe, a subframe number, etc. should be determined. When considering an effective discontinuous reception (DRX) operation of the terminal, it may be desirable that the terminal performs a cell discovery, a cell search, a measurement, etc. in an available constant and short time period after awakening from a DRX state in a viewpoint of power consumption of the terminal. Accordingly, it may be desirable that the terminal transmits the discovery signal using portions of the subframes in which the PSS/SSS is transmitted so that the terminal discovers the discovery signal and the cell search signal in the same subframe. That is, as prescribed in an LTE standard, one wireless frame may be composed of ten subframes, and when numbers 0 to 9 are allocated to ten subframes, the PSS/SSS may be transmitted in a 0th subframe and a fifth subframe. Accordingly, the discovery signal may be designed to be transmitted using portions of the 0th and fifth subframes.

At this time, the discovery signal may be periodically transmitted, and the macro base station may inform the terminal of information regarding a transmission period and an offset through the RRC signaling.

A Time Location in which a Discovery Signal is Transmitted in a Subframe

Since a physical downlink control channel (PDCCH) is transmitted with respect to at most four orthogonal frequency division multiplexing (OFDM) symbols according to a bandwidth of a system, the discovery signal may be designed to be transmitted to remaining symbols excluding the first four OFDM symbols in the subframe. Further, the terminal may be designed to estimate a cell index and a synchronization with respect to the cell using the discovery signal. As each of the conventional PSS and SSS are transmitted in one OFDM symbol, the discovery signal may be configured to be transmitted to two adjacent OFDM symbols.

A Discovery Signal Design Method

It may be desirable that the terminal estimates time and frequency synchronization with respect to a small cell signal and obtains a cell ID of the small cell using the discovery signal. Further, it may be desirable to reuse a structure of the conventional PSS/SSS used in the LTE by considering complexity of the base station and the terminal.

In this inventive concept, a discovery signal design method which will be described hereinafter may be proposed by considering a frequency domain location in which the discovery signal is transmitted, a time location in a subframe, a subframe number, etc.

Figure 3:
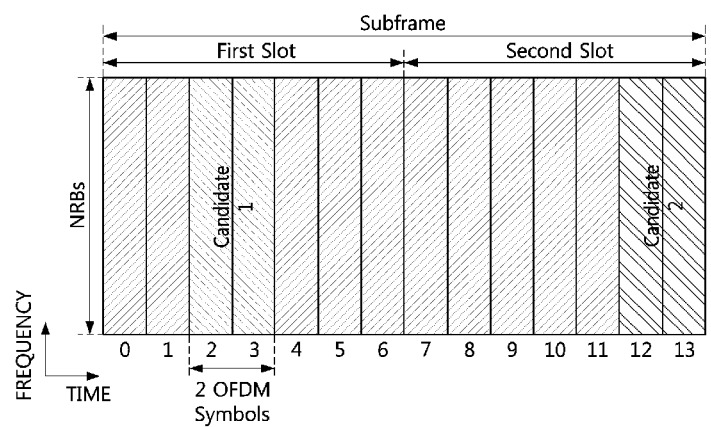
FIG. 3 illustrates one example of a method of transmitting a discovery signal using a $0^{th}$ subframe in a subframe structure having a normal cyclic prefix (CP).
Figure 4:
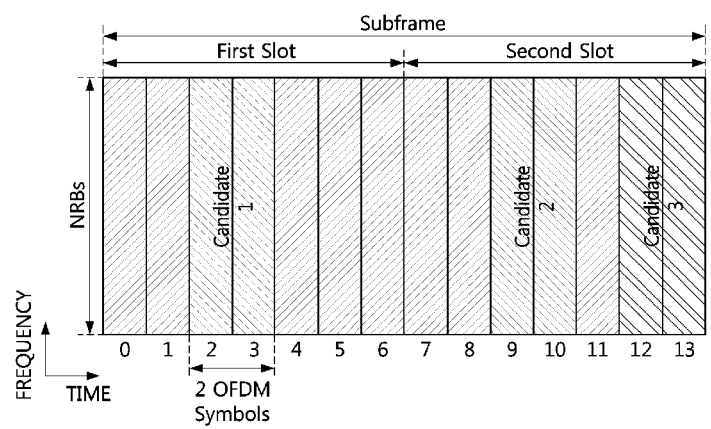
FIG. 4 illustrates one example of a method of transmitting a discovery signal using a fifth subframe in a subframe structure having a normal CP.
Figure 5:
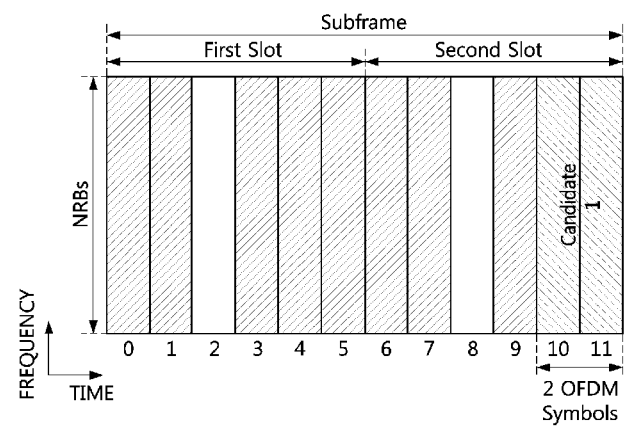
FIG. 5 illustrates one example of a method of transmitting a discovery signal using a $0^{th}$ or a fifth subframe in a subframe structure having an extended CP.

FIGS. 3 to 5 are conceptual diagrams illustrating a discovery signal design method according to an exemplary embodiment of the inventive concept, and illustrate a discovery signal design method when a small cell uses a carrier frequency of a macro cell.

First, when the subframe number in which the discovery signal is transmitted is 0 or 5 and the locations of the frequency domain are N resource blocks (RBs) located in the middle of a bandwidth of a macro cell system, the discovery signal may be transmitted using the methods shown in FIGS. 3 to 5.

FIG. 3 illustrates a resource location for transmission of a discovery signal when transmitting the discovery signal using a 0th subframe in a subframe structure having a normal cyclic prefix (CP).

In FIG. 3, since a cell-specific reference signal (CRS) is transmitted in 0th, first, fourth, seventh, eighth, and eleventh OFDM symbols, it may be desirable not to transmit the discovery signal to the symbols in order to avoid a collision with the CRS. Further, since the PSS and the SSS are transmitted in fifth and sixth OFDM symbols and a physical broadcast channel (PBCH) is transmitted to the seventh and tenth OFDM symbols, it may be also desirable not to transmit the discovery signal to the symbols. Accordingly, locations of the OFDM symbols capable of transmitting the discovery signal may be second, third, twelfth, and thirteen symbols.

When transmitting the discovery signal through two OFDM symbols, symbols capable of transmitting the discovery signal as shown in FIG. 3 according to a condition described above may be the second and third symbols (Candidate 1), and the twelfth and thirteen symbols (Candidate 2).

FIG. 4 illustrates a resource location for transmission of a discovery signal when transmitting the discovery signal using a fifth subframe in a subframe structure having a normal CP.

Referring to FIG. 4, the PBCH may not be transmitted in the fifth subframe unlike the 0th subframe. When applying a condition similar to a symbol determination method for transmitting the discovery signal in the 0th subframe shown in FIG. 3 by considering this, the discovery signal may be transmitted in the second and third OFDM symbols (Candidate 1), the ninth and tenth OFDM symbols (Candidate 2), or the twelfth and thirteenth OFDM symbols (Candidate 3).

FIG. 5 illustrates a resource location for transmission of a discovery signal when transmitting a discovery signal using a $0^{th}$ or a fifth subframe in a subframe structure having an extended CP.

In FIG. 5, since the CRS is transmitted in the 0th, first, third, sixth, seventh, and ninth OFDM symbols and the PSS/SSS is transmitted in the fourth and fifth OFDM symbols, it may be desirable not to transmit the discovery signal in a period of the OFDM symbols in order to avoid a collision with the CRS and the PSS/SSS. Accordingly, locations of the OFDM symbols in which the discovery signal can be transmitted may be the tenth and eleventh symbols.

The terminal may perform an operation of searching for the discovery signal in the OFDM symbols.

When a Small Cell Transmits a Discovery Signal Using a Carrier Frequency F2 Allocated to its Own (F1≠F2)

The small cell may transmit the discovery signal in the dormant state.

Meanwhile, when the small cell is in the active state, the following two methods may be considered according to whether to transmit the discovery signal.

(Method 1) when the small cell is in the active state, the small cell may not transmit the discovery signal.

(Method 2) even when the small cell is in the active state, the small cell may transmit the discovery signal.

Hereinafter, each of the two methods will be described in detail.

(Method 1) A Method of not Transmitting a Discovery Signal when the Small Cell is in the Active State This method may be a method of transmitting the discovery signal only when the small cell is in the dormant state. When the small cell is in the dormant state and transmits the discovery signal using the carrier frequency allocated to its own, as described above, a case in which the small cell transmits the discovery signal in the 0th subframe and a case in which the small cell transmits the discovery signal in the fifth subframe may be considered.

Figure 6:
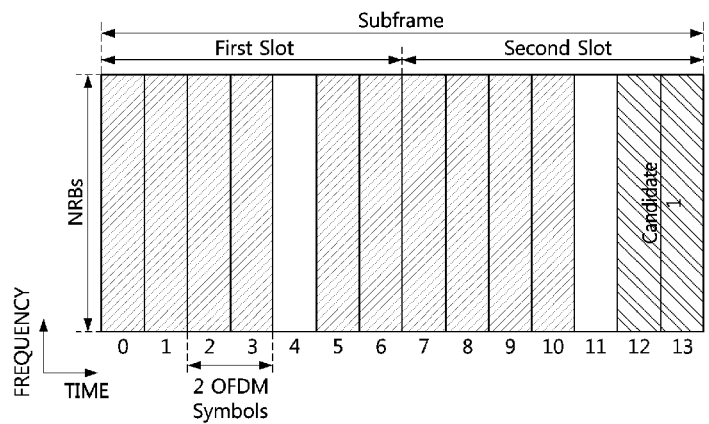
FIG. 6 illustrates another example of a method of transmitting a discovery signal using a $0^{th}$ subframe in a subframe structure having a normal CP.

FIG. 6 illustrates a method of transmitting a discovery signal using a $0^{th}$ subframe in a subframe structure having a normal CP.

In FIG. 6, peripheral small cells may transmit the PDCCH in a period of the 0th, first, second, and third OFDM symbols. Accordingly, it may be desirable not to transmit the discovery signal in the period of the 0th to third OFDM symbols in order not to have an influence on PDCCH detection performance of the terminals which are in the peripheral small cells. Further, since the peripheral small cells may transmit the PSS/SSS in the fifth and sixth OFDM symbols, it may be desirable not to transmit the discovery signal even to the symbols in order not to have an influence on PSS/SSS detection performance of the terminal which are in the peripheral small cells. Moreover, since the PBCHs of other cells are transmitted in the seventh to tenth OFDM symbols, it may be desirable not to transmit the discovery signal even in a period of the seventh to tenth OFDM symbols. Meanwhile, as described above, since it is desirable to transmit the discovery signal through two OFDM symbols, a candidate for transmitting the discovery signal may be two adjacent OFDM symbols among the eleventh to thirteen OFDM symbols as shown in FIG. 6. In FIG. 6, an example in which the twelfth and thirteenth OFDM symbols (Candidate 1) are the candidate symbols is illustrated. The small cell may transmit the discovery signal in the candidate OFDM symbols.

When the terminal discovers the discovery signal in the subframe (that is, the 0th subframe) shown in FIG. 6, the terminal may search the discovery signal in the candidate OFDM symbols.

Figure 7:
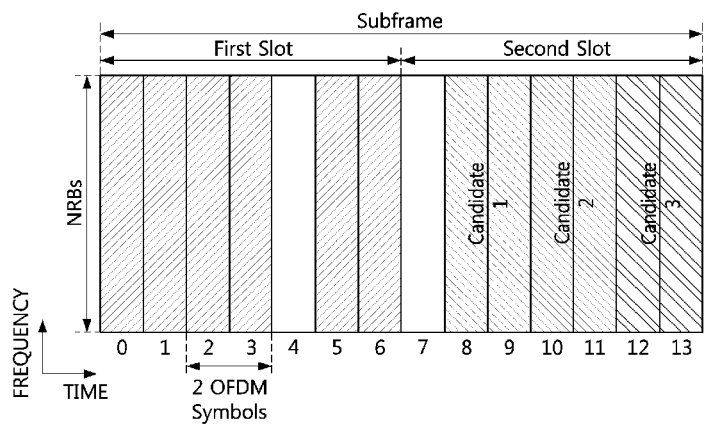
FIG. 7 illustrates a method of transmitting a discovery signal using a fifth subframe in a subframe structure having a normal CP.

FIG. 7 illustrates a method of transmitting a discovery signal using a fifth subframe in a subframe structure having a normal CP.

Unlike the 0th subframe shown in FIG. 6, the fifth subframe shown in FIG. 7 may have a feature in which the PBCH is not transmitted in the seventh to tenth OFDM symbols. Accordingly, further, the discovery signal may additionally be transmitted even in a period of the seventh to tenth OFDM symbols. According to this condition, candidates for transmitting the discovery signal may be the eighth and ninth OFDM symbols (Candidate 1), the tenth and eleventh OFDM symbols (Candidate 2), and the twelfth and thirteenth OFDM symbols (Candidate 3) as shown in FIG. 7. The small cell may transmit the discovery signal in the OFDM symbols corresponding to one among the three candidates described above.

When the terminal searches for the discovery signal in the subframe (that is, the fifth subframe) shown in FIG. 7, the terminal may search for the discovery signal in the candidates described above.

Figure 8:
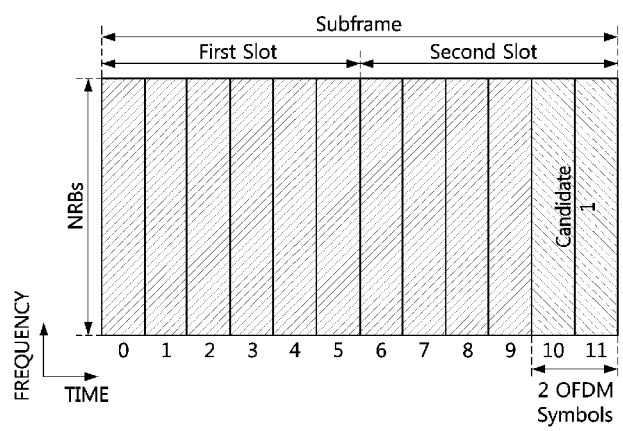
FIG. 8 illustrates a method of transmitting a discovery signal using a $0^{th}$ subframe in a subframe structure having an extended CP.

FIG. 8 illustrates a method of transmitting a discovery signal using a $0^{th}$ subframe in a subframe structure having an extended CP.

In FIG. 8, since the peripheral small cells transmit the PDCCH in a period of the 0th, first, second, and third OFDM symbols, transmit the PSS/SSS in a period of the fourth and fifth OFDM symbols, and transmit the PBCH in the sixth to ninth OFDM symbols, it may be desirable not to transmit the discovery signal in a period of the 0th to ninth OFDM symbols in order not to have an influence on PDCCH, PSS/SSS, PBCH detection performance of the terminals which are in the peripheral small cells. Further, as described above, since it is desirable to transmit the discovery signal through two OFDM symbols, the candidates for transmitting the discovery signal may be the tenth and eleventh OFDM symbols (Candidate 1) as shown in FIG. 8. The small cell may transmit the discovery signal using the candidate OFDM symbols.

When the terminal searches for the discovery signal in the 0th subframe having the extended CP, the terminal may search for the discovery signal in the candidates described above.

FIG. 9 illustrates a method of transmitting a discovery signal using a fifth subframe in a subframe structure having an extended CP.

In FIG. 9, since the peripheral small cells may transmit the PDCCH in a period of the 0th, first, second, and third OFDM symbols, and transmit the PSS/SSS in the fourth and fifth OFDM symbols, it may be desirable not to transmit the discovery signal in the period of the OFDM symbols in order not to have an influence on the PDCCH, PSS/SSS detection performance of the terminals which are in the peripheral small cells. Further, as described above, since it is desirable to transmit the discovery signal through two OFDM symbols, the candidates for transmitting the discovery signal may be the sixth and seventh OFDM symbols (Candidate 1), the eighth and ninth OFDM symbols (Candidate 2), and the tenth and eleventh OFDM symbols (Candidate 3) as shown in FIG. 9. The small cell may transmit the discovery signal using the OFDM symbols corresponding to one among the three candidates.

When the terminal searches for the discovery signal in the fifth subframe having the extended CP, the terminal may search for the discovery signal among the candidates.

(Method 2) A Method of Transmitting a Discovery Signal Even when a Small Cell is in an Active State This method may be a method of transmitting the discovery signal when the small cell is in not only the dormant state but also the active state. A reason of transmitting the discovery signal even when the small cell is in the active state may be for improving cell index detection performance of the terminals which are included in the small cell. When the peripheral cells are synchronized in the subframe and symbol, the peripheral cells may transmit the PSS/SSS in the same OFDM symbol location. Therefore, when there is a cell having greater signal strength than another cell among the peripheral cells, the PSS/SSS detection performance of the terminal with respect to other cells may be deteriorated.

In the discovery signal design method according to an embodiment of the invention concept, the discovery signal may be designed so that the adjacent cells transmit the discovery signal in different OFDM symbol locations. Further, the specific cells may perform a muting operation in which the peripheral cells do not transmit anything with respect to a resource of transmitting the discovery signal according to the need. Accordingly, the detection performance with respect to the discovery signal of the terminal may be improved.

A location of the OFDM symbol in which the discovery signal is transmitted may be configured as shown in FIGS. 6 to 9.

When a Macro Cell and a Small Cell Use the Same Carrier Frequency (F1=F2)

In the case in which the macro cell and the small cell use the same carrier frequency, the discovery signal may be designed and transmitted by applying the same method as the case in which the small cell transmits the discovery signal using the carrier frequency F1 of the macro cell among the methods described above.

Sequence Design of a Discovery Signal

Primary Discovery Signal (PDS) Sequence Design

Since the discovery signal performs a function similar to a synchronization signal prescribed in a 3GPP LTE standard, the discovery signal may be designed as a structure similar to a conventional PSS/SSS. That is, the discovery signal may be composed of a primary discovery signal (PDS, hereinafter, it may be abbreviated to PDS) and a secondary discovery signal (SDS, hereinafter, it may be abbreviated to SDS), and the PDS and SDS may be configured to be transmitted in different OFDM symbol locations. Further, the PDS may be designed to perform a function similar to the PSS and have the same structure (that is, a sequence length, a resource element mapping method, etc.) as the PSS. The SDS may be designed to have the same structure as the SSS. Accordingly, a conventional PSS/SSS detection algorithm may be similarly applied when detecting the PDS/SDS.

However, the sequence of the PDS/SDS may be designed to be different from the sequence of the PSS/SSS so as to allow the terminal to differentiate between the conventional PSS/SSS and the discovery signal (that is, PDS/SDS).

A relation between the PDS/SDS and a cell ID $N_{ID}^{cell}$ may be configured as Equation 1 like a relation between the PSS/SSS and the cell ID.

$$N_{ID}^{cell} = 3N_{ID}^{(1)} + N_{ID}^{(2)} \quad \text{[Equation 1]}$$

In Equation 1, $N_{ID}^{(1)}$ represents an integer value which are between 0 to 167, and $N_{ID}^{(2)}$ represents any one value among 0, 1, and 2.

The sequence d(n) with respect to the PDS may use a frequency domain Zadoff-Chu sequence expressed by Equation 2 like the PSS.

$$d_u(n) = \begin{cases} e^{-j\frac{\pi u n(n+1)}{63}} & n = 0, 1, \ldots, 30 \\ e^{-j\frac{\pi u (n+1)(n+2)}{63}} & n = 31, 32, \ldots, 61 \end{cases} \quad \text{[Equation 2]}$$

In Equation 2, the Zadoff-Chu root sequence index u may be given as shown in FIG. 10. In FIG. 10, A1, A2, and A3 may be integer values which are between 0 and 61, and use values excluding 25, 29, and 34. At this time, 25, 29, and 34 may be excluded since the PSS uses the values.

SDS Sequence Design

The sequence d(n) with respect to the conventional SSS may be generated by Equation 3.

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad \text{[Equation 3]}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

In Equation 3, $s_0^{(m_0)}$, $s_1^{(m_1)}$, $c_0(n)$, $c_1(n)$, $z_1^{(m_0)}(n)$, and $z_1^{(m_1)}(n)$ may be sequences generated by m-sequence, $m_0$ and $m_1$ may be parameters induced from a physical-layer cell-identity group $N_{ID}^{(1)}$, and scrambling sequences $c_0(n)$ and $c_1(n)$ may be parameters associated with a physical-layer identity $N_{ID}^{(2)}$. Accordingly, the following three methods of generating the SDS sequence unlike the SSS sequence may be considered.

(Method 1) when generating the SDS sequence, a method of configuring a relation between $c_0(n)$, $c_1(n)$ and $N_{ID}^{(2)}$ unlike the SSS (Method 2) when generating the SDS sequence, a method of configuring a relation between $m_0$, $m_1$ and $N_{ID}^{(1)}$ unlike the SSS (Method 3) a method of applying both the methods 1 and 2

First, when generating the SDS sequence, the method (method 1) of configuring the relation between $c_0(n)$, $c_1(n)$ and $N_{ID}^{(2)}$ unlike the SSS may apply a method of adding an offset K as Equation 4 when generating $c_0(n)$ and $c_1(n)$.

$$c_0(n) = \tilde{c}((n + N_{ID}^{(2)} + K) \bmod 31)$$

$$c_1(n) = \tilde{c}((n + N_{ID}^{(2)} + 3 + K) \bmod 31) \quad \text{[Equation 4]}$$

In Equation 4, since $N_{ID}^{(2)}$ has a value of one among 0, 1, and 2, $\{N_{ID}^{(2)}, N_{ID}^{(2)}+3\}$ may have a value which is among 0, 1, 2, 3, 4, and 5. Accordingly, K should use an integer value which is equal to or more than 6 and is equal to or less than 25 in order to generate the SDS sequence unlike the SSS sequence. As such, when setting the value of K, $\{N_{ID}^{(2)}+K, N_{ID}^{(2)}+3+K\}$ may have a value which is from 6 to 30. For example, K=6.

When generating the SDS sequence, the method (method 2) of configuring the relation between $m_0$, $m_1$ and $N_{ID}^{(1)}$ unlike the SSS may apply a method of adding an offset L as Equation 5 when generating $m_0$ and $m_1$.

$$m_0 = m' \bmod 31$$ [Equation 5]

$$m_1 = (m_0 + \lfloor m'/31 \rfloor + 1 + L) \bmod 31$$

$$m' = N_{ID}^{(1)} + q(q+1)/2,$$

$$q = \left\lfloor \frac{N_{ID}^{(1)} + q'(q'+1)/2}{30} \right\rfloor,$$

$$q' = \lfloor N_{ID}^{(1)}/30 \rfloor$$

In Equation 5, when L is smaller than 7, since a pair equal to a pair of ($m_0$, $m_1$) generated when generating the conventional SSS can be generated, it may be desirable that L uses an integer value which is equal to or more than 7 and is equal to or less than 29.

The method of applying both the methods 1 and 2 may generate the SDS sequence by applying both the offset K proposed in the method 1 and the offset L proposed in the method 2.

Channel State Information-Reference Signal (CSI-RS)-Based Discovery Signal Design Hereinafter, a method of designing the discovery signal based on a non-zero power (NZP) CSI-RS which is prescribed in the 3GPP LTE standard will be described.

According to the 3GPP LTE standard, the number of antenna ports supported by the CSI-RS may be 1, 2, 4, and 8. A CSI-RS resource occupied by each antenna port occupies two resource elements (REs) for one resource block (RB), but the two resource elements may have the same location on a frequency axis.

Figure 11:
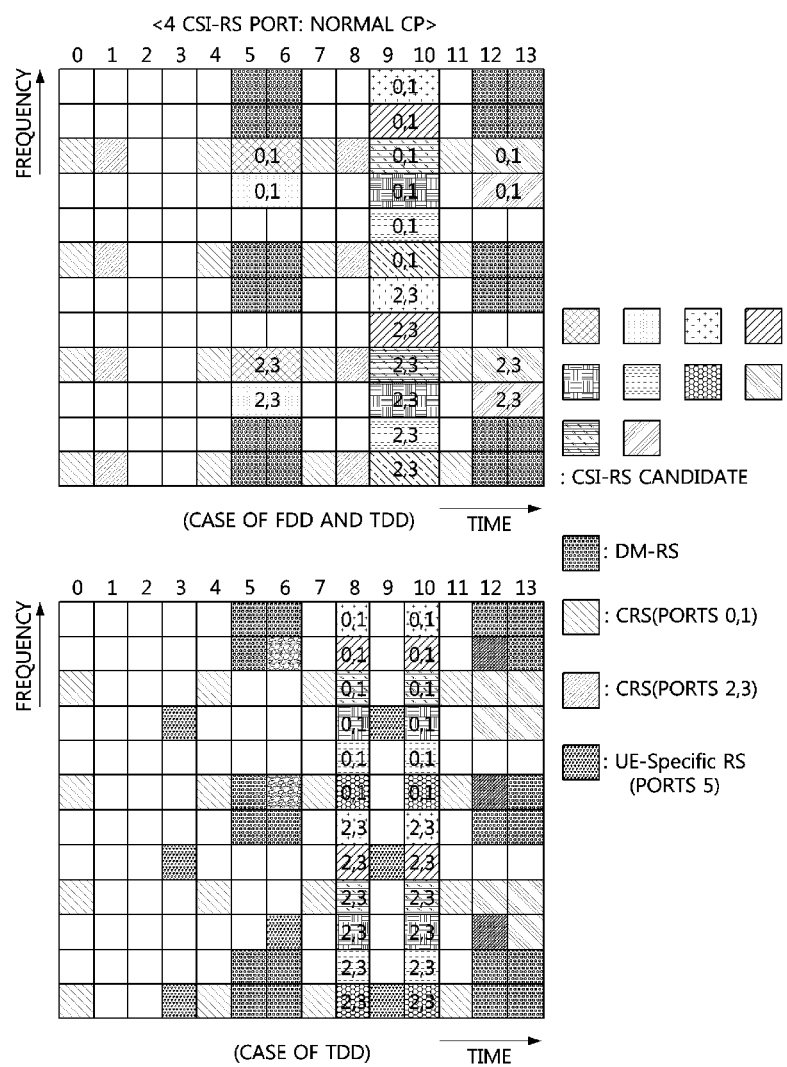
FIG. 11 illustrates resource location of a channel state information-reference signal (CSI-RS) when the number of CSI-RS antenna ports is 4.

FIG. 11 illustrates resource location of a CSI-RS when the number of CSI-RS antenna ports is 4.

In FIG. 11, the resource elements (REs) to which the numbers are given represent resources in which the CSI-RS can be transmitted, one CSI-RS port may be transmitted through four resource elements to which the numbers 0, 1, 2, and 3 are given among the resource elements marked by the same pattern. The four resource elements (REs) configured as shown in FIG. 11 may be referred to as a CSI-RS resource group.

Referring to FIG. 11, in a case of the FDD, there may be 10 resource configuration methods with respect to the CSI-RS in one subframe, and in a case of the TDD, there may be 16 resource configuration methods. However, in a case of both the FDD and the TDD, at most ten different CSI-RS resource groups may be used for transmission of the CSI-RS in one subframe.

The discovery signal based on the CSI-RS may be designed as follows.

The discovery signal based on the CSI-RS may basically reuse a resource allocation of the CSI-RS and a sequence generation method.

The discovery signal of one cell may permit to use the CSI-RS resource corresponding to the four antenna ports. That is, the discovery signal with respect to one antenna port may be configured to use by occupying the CSI-RS resource (four resource elements) corresponding to the four antenna ports.

In a case of the CSI-RS corresponding to one or two antenna ports, since a density on the frequency axis is only one resource element (RE) for one resource block (RB), a measurement error with respect to the discovery signal may be great. In order to reduce the measurement error, it may be desirable to configure so that the density on the frequency axis is at least two resource elements for one resource block like the case of the CRS. The discovery signal for one cell may use only one antenna port in one subframe by considering this, and a resource used by one antenna port may be configured to correspond to the CSI-RS resource (that is, four REs) with respect to four antenna ports.

Meanwhile, since the CSI-RS resource corresponding to eight antenna ports occupies four resource elements for one resource block, there may be a disadvantage in which overhead of the discovery signal is very increased when transmitting the discovery signal to the CSI-RS resource corresponding to the eight antenna ports. Accordingly, it may be desirable to transmit the discovery signal using the CSI-RS resource corresponding to the four antenna ports rather than the eight antenna ports.

According to the 3GPP LTE standard, when the number of the CSI-RS antenna ports is 4, there may be a total of ten methods of configuring a location of the CSI-RS resource (CSI-RS configuration) in the subframe in the case of the FDD, and there may be a total of sixteen methods in the case of the TDD. When applying the CSI-RS configuration method supported in a conventional LTE standard as it is, a total of ten discovery signals may be transmitted in the same subframe in the case of the FDD, and at most ten discovery signals may be transmitted in the same subframe according to the CRS configuration in the case of the TDD.

The CSI-RS-based discovery signal design method according to the inventive concept may have an advantage of maintaining backward compatibility by designing so as not to have an influence on legacy terminals supporting the conventional standard. That is, the discovery signal may not have an influence on operation of the terminals supporting the LTE Release-10/11 standard by configuring resources in which the discovery signal is transmitted as a zero power CSI-RS resource with respect to conventional LTE Release-10/11 terminals and applying a PDSCH rate matching with respect to the resources.

The base station may inform the terminal of resource configuration information with respect to the discovery signal. Here, the base station may also inform the terminal of sequence information in which each discovery signal uses. When reusing the CSI-RS sequence for generating the sequence of the discovery signal, the base station may inform the terminal of only an initialization parameter needed for the sequence generation. In this case, the sequence information of which the base station informs the terminal may be the initialization parameter needed for the sequence generation, and be configured by a value of a physical cell ID or a virtual cell ID $N_{ID}^{CSI}$.

[A Sequence Generation Method of a Discovery Signal]

A sequence $r_{1,n_s}(m)$ with respect to the discovery signal may be defined by Equation 6.

$$r_{l,n_s}(m) = \frac{1}{\sqrt{2}}(1 - 2 \cdot c(2m)) + j\frac{1}{\sqrt{2}}(1 - 2 \cdot c(2m+1)),$$ [Equation 6]

$$m = 0, 1, \ldots, N_{RB}^{max,DL} - 1$$

In Equation 6, $n_s$ represents a slot number in one subframe, and l represents an OFDM symbol number in a slot. A pseudo-random sequence c(i) may be equal to the sequence defined in the 3GPP LTE standard. The pseudo-random sequence may be initialized by a value of $C_{init}$ shown in Equation 7 for each OFDM symbol.

$$c_{init} = 2^{10} \cdot (7 \cdot (n_s+1)+l+1) \cdot (2 \cdot N_{ID}^{CSI}+1) + 2 \cdot N_{ID}^{CSI} + N_{CP}$$ [Equation 7]

In Equation 7, $N_{CP}$ is 1 in the normal CP, and is 0 in the extended CP.

The virtual cell ID $N_{ID}^{CSI}$ may be equal to $N_{ID}^{cell}$ when the configuration information is not provided from a higher layer.

[A Discovery Signal Configuration Method]

Configuration with respect to the discovery signal may include configuration with respect to the sequence, and resource configuration (a subframe number and a resource location in a subframe).

First, configuration with respect to the sequence of the discovery signal is as follows.

Configuration information with respect to the sequence of the discovery signal may mean an initialization parameter with respect to the sequence. The base station may inform the terminal of the initialization parameter for each discovery signal configuration resource. At this time, the initialization parameter may be one among a total of 504 numbers which are from 0 to 503. When the base station does not inform the terminal of the initialization parameter, since the terminal should perform a blind detection on 504 initialization values, complexity of the terminal may be greatly increased. Accordingly, it may be desirable that the base station informs the terminal of the initialization parameter.

The following three methods may be considered as the discovery signal resource configuration method.

Method (1): A Method of Configuring a Resource for Each Discovery Signal

This method may be a method in which the base station informs the terminal of subframe configuration information and the resource configuration information in the subframe for each discovery signal. Here, a location with respect to the subframe in which the discovery signal is transmitted may be expressed by period information and offset information.

The period with respect to the subframe transmitting the discovery signal may be expressed by one among values such as 20, 40, 80, and 160, etc. Here, a unit of the period may be a subframe, and the period which is 20 may mean that the discovery signal is transmitted every twenty subframes.

Further, a unit of the offset with respect to a transmission location of the discovery signal may be a subframe.

The method (1) may have an advantage which can freely configure the subframe period in which the discovery signal is transmitted, the offset, the resource location in the subframe, etc. for each discovery signal, but, may have a disadvantage in which the signaling overhead is great.

Method (2): A Method of Configuring Every Discovery Signal at One Time

This method may be a method in which the base station provides information with respect to every discovery signal to the terminal using one configuration information. Here, the configuration information may be composed of the subframe number in which the discovery signals are transmitted and the resource information in the subframe.

The configuration information with respect to the subframe number in which the discovery signal is transmitted may be configured as a period and an offset. Here, the subframe period may be configured in units of subframes, and be expressed by one value among values of 20, 40, 80, and 160, etc. Further, the offset information may be configured in units of subframes.

In the method (2), every discovery signal may have the same subframe period and offset.

The discovery resource configuration information in the subframe may apply conventional zero power (ZP) CSI-RS resource configuration information. The configuration information with respect to a conventional ZP CSI-RS resource may be configured as a bit map of a 16-bit size, and the base station may inform the terminal of the ZP CSI-RS resource configuration information by transmitting the bit map information to the terminal. The base station may inform the terminal of the discovery resource configuration information through the bit map of the 16-bit size like the method described above. Each bit in the bit map may be configured to follow the rule prescribed in the 3GPP LTE standard, and express whether there is the discovery signal in a corresponding resource by setting a value of each bit as 0 or 1.

The method (2) may have an advantage in which the number of bits needed for a signaling is small compared with the method (1), but may have a disadvantage in which flexible configuration is difficult.

Method (3): a method in which the base station informs the terminal of the resource configuration information with respect to the discovery signals using a plurality of pieces of ZP CSI-RS configuration information This method may classify the discovery signals into a plurality of groups, and be a method in which the base station informs the terminal of the resource configuration information with respect to the discovery signal using one ZP CSI-RS resource configuration information with respect to the discovery signals included in each group. At this time, the ZP CSI-RS resource configuration information corresponding to the number of the groups may be required.

The discovery signal transmission resources may be configured to satisfy the following features for the backward compatibility.

The resources prescribed by one ZP CSI-RS configuration information may be configured to include every discovery transmission resource.

When using a plurality of pieces of ZP CSI-RS configuration information, much more discovery signals may be configured for the terminal. In this case, the subframes in which the discovery signals in which the terminal should monitor or measure are transmitted may be repeated with a constant period on a time axis.

A Cell Discovery Signal Transmission and Reception Resource

The cell may transmit the cell discovery signal using a downlink frequency band when the cell uses the FDD method. The cell may transmit the cell discovery signal using a downlink subframe or a special subframe when the cell uses the TDD method.

The terminal discovery signal may be transmitted using an uplink frequency band when using the FDD method, and may be transmitted using an uplink subframe or a special subframe when using the TDD method.

A resource allocated for the cell discovery signal transmission may be used by presetting a range of a time-frequency resource which is commonly applied between the cells. For this, the subframe synchronization between the cells should be matched. When one cell transmits one cell discovery signal, the terminal may receive the discovery signals of a plurality of cells in a short time by multiplexing and transmitting a plurality of cell discovery signals in the same time-frequency resource of a predetermined range.

An allocation method of a resource used for the cell discovery signal transmission, that is, the discovery resource, will be described below. Hereinafter, the subframe in which the cell discovery signal can be transmitted may be referred to as a discovery subframe.

Figure 12:
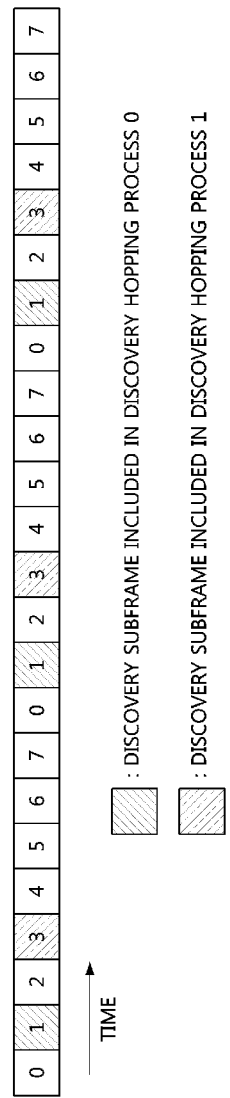
FIG. 12 is a conceptual diagram illustrating a subframe allocation method for transmission of a discovery signal.

A Configuration of a Period and an Offset of a Subframe for Transmission of the Discovery Signal FIG. 12 is a conceptual diagram illustrating a subframe allocation method for transmission of a discovery signal.

As shown in FIG. 12, the subframes having a constant subframe interval may be referred to as a discovery subframe, and designated discovery subframes may configure a discovery hopping process. Further, as shown in FIG. 12, a plurality of independent discovery hopping processes may be configured. In FIG. 12, a discovery hopping process 0 and a discovery hopping process 1 are illustrated as an example of the discovery hopping process.

A Frequency Domain Resource Mapping Method of a Discovery Signal

The time-frequency resource used for transmission of one discovery signal may be determined by the following discovery hopping process number and discovery resource index.

The discovery hopping process number NDC_hop_ID

The discovery resource index NDC_ID

When the discovery resource index is given with respect to the given discovery hopping process, a resource of the time-frequency domain may be determined. One discovery signal may use a range of one or a plurality of resource blocks (RBs) on the frequency axis, and may use one or a plurality of OFDM symbols on the time axis.

The sequence of the discovery signal may be configured to correspond to the cell ID (or cell index) information one to one. Accordingly, the terminal may detect the sequence of the received discovery signal, and may know the cell ID (or, cell index) information corresponding to the detected sequence. Further, the terminal may estimate a proximity degree of a corresponding cell by performing the measurement of the detected sequence.

Hereinafter, a frequency domain resource mapping method of a discovery signal will be described, and items which should be considered when mapping the frequency domain resource of the discovery signal will be described.

First, the frequency domain resource mapping method of the discovery signal may be classified into the following two methods.

FIG. 13 is a conceptual diagram illustrating a frequency domain resource mapping method of a discovery signal.

[Method A] as shown in (a) of FIG. 13, only one discovery signal may be transmitted in one unit transmission time period. Here, the discovery signals of other cells adjacent to one cell may be temporally allocated in different locations. However, since two cells are very far away from each other, the plurality of discovery signals may be transmitted using the same resource when it is possible to neglect an influence on each other.

[Method B] as shown in (b) of FIG. 13, the plurality of discovery signals mapped to different frequency resources in one unit transmission time period may be simultaneously transmitted. At this time, since received power of a cell adjacent to a predetermined cell is very great, the discovery signal of another cell having relatively very small received power may not be normally detected. That is, even when an automatic gain control (AGC) is properly performed in the terminal, the discovery signal having the small received power may not be properly detected in the terminal by decreasing the number of effective bits of an analog-to-digital converter (ADC) (that is, due to a limitation of resolution). In order to solve a reception insensibility problem due to a near-far effect between the cells described above, it may be desirable to apply a time axis hopping to the resource for transmission of the discovery signal. When it is possible to neglect an influence on each other since two cells are very far away from each other, the discovery signal may be transmitted using the same resource.

A Time Domain Resource Mapping Using a Latin Square Matrix

For more efficient resource utilization, the time axis discovery resource may be allocated using the Latin square matrix for the [method A] and [method B] described above.

The Latin square matrix having an N×N size may have the following features.

Each element configuring each row may have one value among 1, 2, . . . , N, and the elements in the same row may have different values. That is, each of the numbers 1, 2, . . . , N may exist once in one row.

Each element configuring each column may have one value among 1, 2, . . . , N, and the elements in the same column may have different values. That is, each of the numbers 1, 2, . . . , N may exist once in one column.

When comparing two arbitrary rows in one Latin square matrix, the same number may not be allocated to the same element location.

When comparing two arbitrary columns in one Latin square matrix, the same number may not be allocated to the same element location.

N×N matrixes may be formed by performing a cyclic shift on locations of remaining columns excluding a first column of the N×N Latin square matrix which has a natural order and is symmetric. Since one matrix can be obtained for each cyclic shift, new (N−2) matrixes may be generated through the cyclic shift, and the generated each matrix may be the Latin square matrix satisfying the features. Accordingly, a total number of the Latin square matrixes may be (N−1) by including the Latin square matrix which has a natural order and is symmetric.

The (N−1) Latin square matrixes may further satisfy the following features.

When comparing two rows which are arbitrarily selected in different Latin square matrixes, the same number may be generated once in the same element location.

When comparing two columns which are arbitrarily selected in different Latin square matrixes, the same number may be generated once in the same element location.

A total number of N×(N−1) rows may be obtained from the (N−1) Latin square matrixes, and when selecting two arbitrary rows from them, it may be known that the same number is generated only at most once in the same element location.

The features of the Latin square matrix described above may be used for the time domain resource mapping of the discovery signal. The rows of the Latin square matrix may correspond to a time axis resource mapping pattern of the discovery signal. That is, when N rows included in one Latin square matrix correspond to the time axis resource mapping pattern of N discovery signals, the N discovery signals may be mapped to a resource which do not overlap on the time axis. Accordingly, the N discovery signals may not overlap on a time-frequency resource space since the N discovery signals do not overlap on the time axis even when mapping the N discovery signals to the same resource on the frequency axis.

Meanwhile, other Latin square matrixes may correspond to different frequency resources. Since a total of (N−1) Latin square matrixes are obtained with respect to a degree N, a total of (N−1) non-overlapping resources may be allocated on the frequency axis, and each resource may correspond to one among the (N−1) Latin square matrixes one to one.

FIG. 14 illustrates an example of a 4×4 Latin square matrix, and illustrates a total of three Latin square matrixes generated through the cyclic shift method described above when N is 4.

Figure 15:
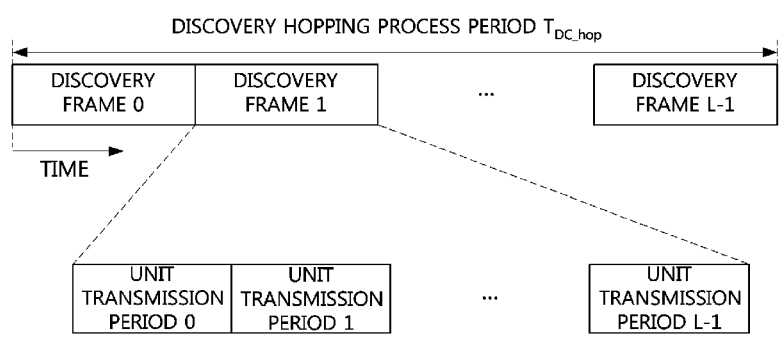
FIG. 15 is a conceptual diagram illustrating a construction of a time domain for a mapping of a discovery signal.

FIG. 15 is a conceptual diagram illustrating a construction of a time domain for a mapping of a discovery signal.

Referring to FIG. 15, one period of the discovery hopping process may be composed of L discovery frames, and each discovery frame may include L unit transmission periods. One discovery signal may have a temporal range corresponding to the unit transmission period, and the unit transmission period may be composed of $N_{Symbol}^{DS}$ OFDM symbols. That is, one discovery signal may be transmitted through $N_{Symbol}^{DS}$ OFDM symbols of the discovery signal unit transmission period.

Indexes of i=0, 1, 2, 3, (L−1) may be given to L discovery frames included in one discovery hopping process period according to a time sequence. Further, the indexes of i=0, 1, 2, 3, (L−1) may be given to L discovery signal transmission periods in each discovery frame according to the time sequence.

As described above, in a case of the Latin square matrixes having a L×L size, a total of (L−1) Latin square matrixes may be obtained, and from this, a total of L×(L−1) rows may be obtained. Index values q (q=0, . . . , L−2) may be given to the (L−1) Latin square matrixes, respectively. An index value m may be sequentially given to the L×(L−1) rows, and suppose that T(m) [m=0, 1, 2, . . . , L×(L−1)−1] represents one row. Suppose that T(m)[i] means a value of an element i (i=0, 1, . . . , L−1) of a row m.

When the discovery resource index NDC_ID is m in the given discovery hopping process, a location on the time axis of a corresponding discovery resource may be determined by T(m). That is, the discovery signal transmission resource corresponding to the discovery resource index m may be located in a unit transmission period corresponding to a value of the discovery signal transmission period index T(m)[i] in the discovery frame i.

In the [method A], the plurality of discovery signals may be transmitted using the same frequency resource in one unit transmission period. Here, even when values of the Latin square index q are different, the frequency domain resource used for transmission of the discovery signal may be the same. When mapping the discovery signal resource using two arbitrary rows included in the Latin square matrixes in which values of the q are different, a case in which the unit transmission periods used by the same two discovery signals are the same may be generated once during the discovery hopping process. When mapping each discovery signal resource using two arbitrary rows included in the Latin square matrixes in which the values of the q are identical, the unit transmission periods using the two discovery signals use may not overlap.

In the [method B], the frequency resource may be determined according to the values of the index q of the Latin square matrix. That is, when the values of the q are different, different frequency resources may be used. When mapping the discovery signal resource using two arbitrary rows included in the Latin square matrixes in which values of the q are different, a case in which the unit transmission periods used by the two discovery signals are the same may be generated once during the discovery hopping process time. When mapping the discovery signal resource using two arbitrary rows included in the Latin square matrixes in which the values of the q are identical, the unit transmission periods used by the two discovery signals may not overlap.

Hereinafter, the [method A] will be described in detail.

Figure 16:
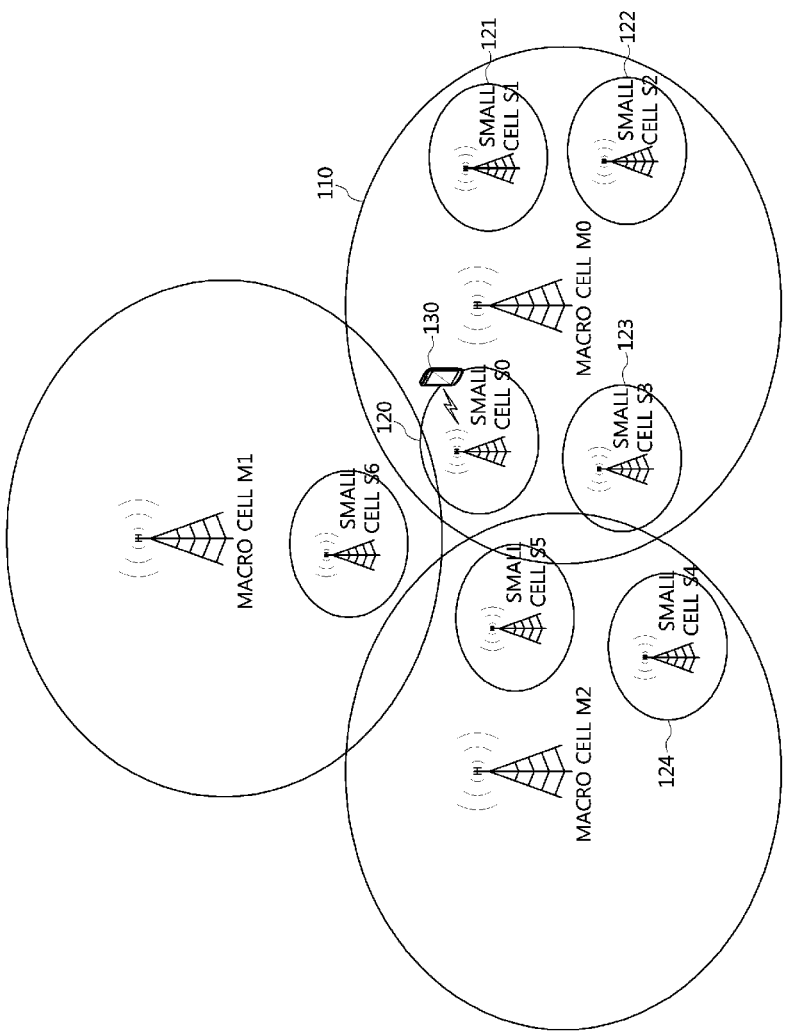
FIG. 16 is a conceptual diagram for describing a cell discovery method by a terminal.

FIG. 16 is a conceptual diagram for describing a cell discovery method by a terminal.

As shown in FIG. 16, suppose that a terminal A 130 is located in the middle of a small cell S0 120. The terminal A 130 may receive the discovery signal having a very great signal level in which the small cell S0 120 transmits. When adjacent small cells transmit the discovery signals using the same resource as the discovery resource used by the small cell S0 12, the terminal A 130 may not detect remaining discovery signals excluding the discovery signal of the small cell S0 120. In order to solve the problem, it may be desirable that the adjacent small cells transmit the discovery signals using resources which do not overlap temporally.

Meanwhile, when every small cell use different temporal resources, the small cells which are far away from each other may be configured to reuse the discovery resource since the small cells use too many wireless resources for transmission of the discovery signal. Here, an efficient reuse of the discovery resource may be needed. For example, when a small cell S4 124 reuses the discovery signal in which the small cell S0 120 uses, the terminal A 130 may not detect the discovery signal in which the small cell S4 124 transmits due to interference of the discovery signal transmitted from the small cell S0 120. In order to solve the problem, it may not be desirable that the time axis resource used by the small cell S4 124 and the time axis resource used by the small cell S0 120 overlap in every transmission period.

The resource mapping method of the discovery signal described in the inventive concept may minimize a period in which the discovery resource of one small cell and the discovery resource of another small cell temporally overlap using the Latin square matrix. By the method, the period in which the discovery resources used by two arbitrary small cells for the transmission overlap temporally may be generated once during the discovery hopping process period.

Figure 17:
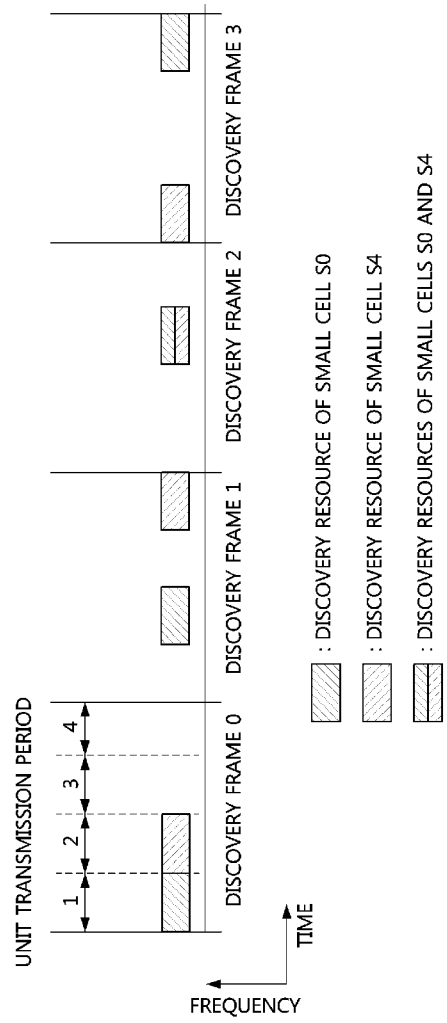
FIG. 17 is a conceptual diagram illustrating a time domain allocation method of a discovery resource using a Latin square matrix.

FIG. 17 is a conceptual diagram illustrating a time domain allocation method of a discovery resource using a Latin square matrix.

Hereinafter, a method of allocating the discovery resource to the time domain using the Latin square matrix will be described in detail with reference to FIGS. 14, 16, and 17.

When the small cell S0 120 uses the time axis resource determined using a row A among three Latin square matrixes shown in FIG. 14, the unit transmission period in which the discovery signal of the small cell S0 120 is transmitted may be 1, 2, 3, and 4 in the discovery frames 0, 1, 2, and 3, respectively. When the small cell S4 124 uses a row F, the unit transmission period in which the discovery signal of the small cell S4 124 uses may be 2, 4, 3, and 1 in the discovery frames 0, 1, 2, and 3. That is, the discovery resource used by two small cells 120 and 124 may overlap only one unit transmission period (a third unit transmission period in the discovery frame 2) among four unit transmission periods. By the method, when allocating the discovery signal to the time domain resource, the terminal A 130 may detect this signal in three unit transmission periods among four unit transmission periods in which the discovery signal of the small cell S4 14(124) is transmitted. When mapping the discovery signals of the plurality of cells to a resource of the time domain, the transmission periods may not overlap on the time axis when using different rows of one Latin square matrix. For example, when the small cells S0 120, S1 121, S2 122, S3 123 map the resource using rows A, B, C, and D of the Latin square matrix shown in FIG. 14, the transmission periods of the discovery signal may not overlap on the time axis.

When generalizing the resource allocation method of the discovery signal described above, the small cells may be grouped by each region, the small cells included in the same group may determine the time axis resource using the rows included in the same Latin square matrix, and the small cells included in different groups may determine the time axis resource using different Latin square matrixes.

For example, when grouping so that the small cells 120, 121, 122, and 123 included in the same macro cell 110 shown in FIG. 16 is included in the same group, the small cells 120, 121, 122, and 123 in the macro cell 110 may determine the time axis resource using the same Latin square matrix, and transmit the discovery signal at different temporal locations. That is, the discovery resource may be determined as follows.

The small cells in the same macro cell may map the discovery resource using different rows of the Latin square matrixes having the same q value.

Adjacent macro cells may allow the small cells included in the cell to use the Latin square matrixes having different q values. That is, when the small cells are included in the adjacent macro cells, the small cells may use the Latin square matrixes having the different q values.

Other regions may use different Latin square matrixes by dividing the one macro cell into a plurality of regions.

The terminal may receive Latin square matrix information used by peripheral cells of the terminal from the base station, and detect the discovery signal using this. Or, even when the base station does not inform the terminal of the Latin square matrix information, the terminal may detect the cell discovery signal using a blind detection when the terminal knows the frequency and temporal range of the discovery resource.

Frequency Hopping

A frequency division multiplexing (FDM) on the discovery resource and a cellular mobile communication resource may be performed in the subframe.

Figure 18:
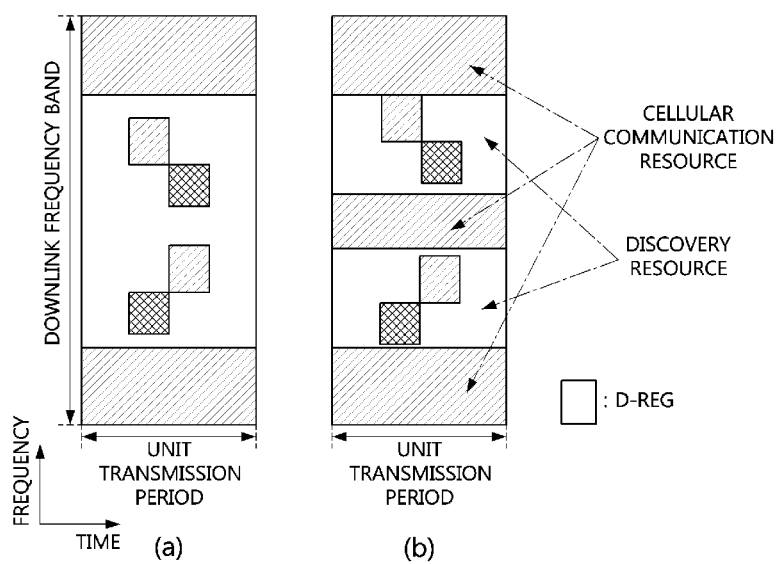
FIG. 18 is a conceptual diagram illustrating a multiplexing method of a resource for a discovery signal.

FIG. 18 is a conceptual diagram illustrating a multiplexing method of a resource for a discovery signal, and illustrates a multiplexing method of the discovery resource and the cellular resource in the discovery subframe in which the discovery signal can be transmitted. Meanwhile, every uplink band may be allocated as a resource for transmission of the discovery signal.

In FIG. 18, D_REG may be a discovery resource group, and one discovery signal may occupy one or a plurality of discovery resource groups. In order to obtain a frequency diversity effect, the frequency hopping may be applied to the resource mapping of the discovery signal. The frequency hopping may be performed in units of D-REGs. That is, the frequency diversity effect may be obtained by evenly distributing locations on the frequency axis of a plurality of D-REGs configuring one discovery signal. For example, as shown in (b) of FIG. 16, the frequency diversity effect may be obtained by being far away from the locations on the frequency axis between two D-REGs included in the same discovery signal.

Resource and Sequence Allocation for the Discovery Signal

Discovery Signal Region Overlapping Problem

It may be desirable to reuse the discovery signal resource spatially in order to increase frequency use efficiency. However, when the cells using the same discovery signal resource are adjacent, a problem in which transmission regions of the discovery signal in which each cell transmits overlap may be generated.

Figure 19:
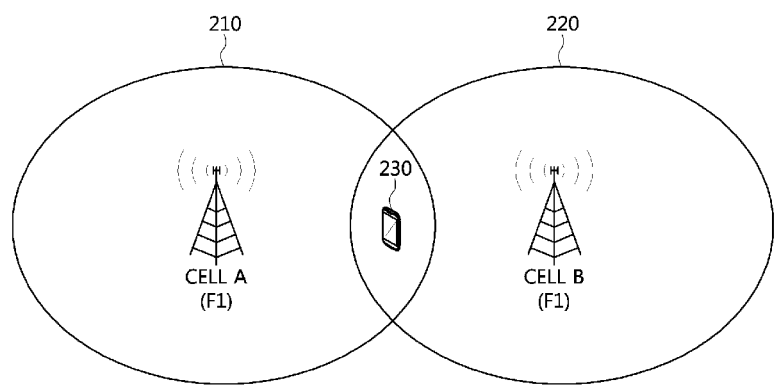
FIG. 19 is a conceptual diagram for describing a region overlapping problem of a cell discovery signal.

FIG. 19 is a conceptual diagram for describing a region overlapping problem of a cell discovery signal.

As shown in FIG. 19, when each of a cell A 210 and a cell B 220 is located outside a counterpart discovery signal detection region and cooperation with respect to the discovery resource used by each cell is not performed, the two cells 210 and 220 may allocate the same transmission resource in order to transmit the discovery signal. Therefore, there may be a portion in which discovery signal reaching regions of the two cells overlap.

In FIG. 19, the terminal may be located in the discovery signal reaching regions of the cell A 210 and the cell B 220. Here, when the discovery signal sequences used by the cell A 210 and the cell B 220 are the same, since the terminal 230 receives a signal obtained by adding two discovery signals transmitted by the cell A 210 and the cell B 220 and detects the discovery signal using the signal, an ambiguity problem may be generated when confirming the cell ID or the index according to the detection of the discovery signal.

As one among methods for solving a channel estimation error due to the overlapping of the discovery signal transmission regions described above, the problem described above may not be generated by using an orthogonal discovery signal resource in each cell through the cooperation between the base stations managing the cell A 210 and the cell B 220. Here, when the cell A 210 and the cell B 220 are managed by different base stations, rapid cooperation between the base stations may be difficult. Accordingly, when previously and differently configuring the sequence of the discovery signal used by the two cells, a problem due to an overlapping of the signal reaching regions may be mitigated when the terminal located in the overlapping region receives the discovery signal. That is, the sequence in which the terminal detects may have a one-to-one corresponding relation with the cell ID or the cell index. When configuring the sequence, ambiguity when confirming the cell ID or the cell index of each cell obtained through the sequence detected by the terminal may not be generated.

The base station may transmit the discovery sequence information needed when the terminal receives the discovery signal to the terminal. The information may include a base sequence capable of being used by the discovery signal and information determining the cyclic shift, etc. The terminal may attempt the detection of the discovery signal based on the discovery sequence information received from the based station.

Discovery Signal Transmission and Reception and Measurement Method

Search and Detection Methods of a Discovery Signal

Search and reception of the cell discovery signal performed by the terminal may be classified as search and reception for a blind discovery, and search and reception for an assisted discovery.

[Search and Reception for the Blind Discovery]

The terminal performing the blind discovery may search for and receive the discovery signal based on only information with respect to the discovery resource range for the blind discovery. The base station should inform the terminal of the discovery resource range for the blind discovery.

[Search and Reception for the Assisted Discovery]

The terminal performing the assisted discovery may search for and receive the discovery signal with respect to only specific discovery resources which are specified by the base station. For the assisted discovery, the base station may inform the terminal of a discovery hopping process number in which each terminal performs the search and the reception, resource indexes, and sequence information.

Measurement Kinds of Discovery Signal

The discovery signal measurement may include measurement of a received signal strength indicator (RSSI) of the discovery signal, a reference signal received power (RSRP) of the discovery signal, and a reference signal received quality (RSRQ) of the discovery signal.

The RSSI of the discovery signal (D-RSSI) may mean received power for each resource element including contribution from every signal source such as a serving cell, a non-serving cell, adjacent channel interference, thermal noise, etc. measured with respect to the resource elements (REs) for transmission of the discovery signal corresponding to the discovery resource (the discovery hopping process number, and discovery resource index) designated by an upper layer.

The RSRP of the discovery signal (D-RSRP) may mean received power for each resource element of the discovery signal corresponding to the discovery resource (the discovery hopping process number, and discovery resource index) designated by an upper layer and the discovery signal sequence.

The RSRQ of the discovery signal (D-RSRQ) may be defined as (N×RSRP)/D-RSSI. Here, N may mean the number of resource blocks (RBs) in a bandwidth in which the D-RSSI measurement is performed. It may be desirable that the D-RSRP and D-RSSI measurement is performed on the same resource block groups.

Measurement on a Specific Discovery Resource and Sequence

The terminal may perform the RSRP measurement on the discovery signal (D-RSRP) corresponding to the specific discovery resource and sequence specified by the base station. The base station may inform the terminal of the discovery resources and sequence information in which the measurement is performed. The terminal may perform the RSRP measurement on the discovery signal (D-RSRP) corresponding to each discovery resource and sequence, and report the result to the base station. The base station may use the measurement result for cell selection, interference control between the cells, etc.

When comparing qualities of wireless links between the cells using different carriers, the RSRQ in which the interference is also considered may be used more usefully rather than the RSRP in which only the signal component of each cell is considered. As prescribed in the LTE standard, a value of the RSRQ may be obtained from values of the RSSI and the RSRP. The CRS-based RSRQ defined in the conventional LTE standard may measure by receiving a reference signal corresponding to an antenna port 0 or antenna ports 0 and 1 among the CRSs transmitted by a cell which is a target of the RSRP measurement. The RSSI may be obtained by measuring total received power received in OFDM symbols corresponding to the antenna port 0 among the CRSs.

When applying the CSI-RS-based discovery signal, the RSRP may be measured by receiving the CSI-RS-based discovery signal. That is, the RSRP may be calculated by receiving the CSI-RS signal used for the discovery and measurement instead of the CRS. In order to ensure a reception quality of the CSI-RS, it may be desirable that the resources used for transmission of the CSI-RS signal used for the discovery and measurement are not used for the transmission by the adjacent cells. Accordingly, similar to a case of the CRS, when performing the RSSI measurement using the total received power received in the OFDM symbols in which the CSI-RS configured for the discovery and measurement is transmitted, exact RSSI measurement may be difficult. It may be desirable to configure a resource for the RSSI measurement separately when considering this. That is, the terminal may be configured to measure the RSSI with respect to only resources configured by the base station for the RSSI measurement. A configuration of a resource for the RSSI measurement may simply use a conventional non-zero power (NZP) CSI-RS resource configuration method or zero power (ZP) CSI-RS resource configuration method. In this case, the terminal may obtain the RSSI by measuring the total received power received in the configured resource elements (REs). The CSI-RS resources used for the RSRP measurement of each cell may be resources used when an actual cell transmits the CSI-RS. Meanwhile, for the measurement on which resource use of each cell is reflected, it may be desirable that the resources used for the RSSI measurement correspond to a resource used for data transmission.

FIG. 20 is a conceptual diagram for describing a method of configuring a resource for transmission of a CSI-RS-based discovery signal and an RSSI measurement resource, and illustrates an example of the CSI-RS-based discovery signal resource and the RSSI measurement resource used by two adjacent transmission points. As shown in FIG. 20, a transmission point A and a transmission point B may transmit the NZP CSI-RS which is the CSI-RS-based discovery signal using different resources, the transmission point A may perform a muting on a resource corresponding to the CSI-RS-based discovery signal of the transmission point B, and the transmission point B may perform the muting on the resource corresponding to the CSI-RS-based discovery signal of the transmission point A. Further, the RSSI measurement resource may use by allocating the same resource regardless of the transmission point. The terminal may measure the RSRP with respect to the transmission point A using the discovery signal resources of the transmission point A. The terminal may measure the RSRP with respect to the transmission point B using the discovery signal resources of the transmission point B. The terminal may measure the RSSI using the resources for the RSSI measurement.

Search and Measurement Report for Discovery Signal Transmission Channel Selection In order to get help when the cell selects a resource used for transmission of the discovery signal transmission, the terminal may perform the discovery signal RSSI (D-RSSI) measurement on the discovery signal included in the range of the specified discovery resource, and transmit the discovery signal corresponding to a value of the smallest discovery signal RSSI (D-RSSI), report using the discovery hopping process number and the resource index with respect to several discovery resources corresponding to a value of the smallest discovery signal RSSI (D-RSSI), or report the measurement result of a corresponding discovery signal RSSI (D-RSSI) together with them to the base station which is in charge of control of the cell. The base station may determine the discovery resource to be used by the cell for transmission of the discovery signal based on the reported search and measurement result.

Measurement Capacity

Discovery Reference Signal Received Power (D-RSRP)

The D-RSRP may be defined as follows.

The D-RSRP may be defined as a linear average of power distribution (a unit of [W]) of resource elements transmitting the discovery signal corresponding to the discovery sequence. The DS resources in which the terminal performs the D-RSRP measurement may be a DS resource element corresponding to the discovery hopping process number and the discovery resource index specified by the upper layer.

The DS sequence in which the terminal performs the D-RSRP measurement may be also configured by the upper layer.

Discovery Received Signal Strength Indicator (D-RSSI)

The D-RSSI may be defined as follows.

The D-RSSI may be defined as a linear average of total received power (a unit of [W]) of resource elements transmitting the discovery signal including the contribution from every signal source including serving and non-serving cells, adjacent channel interference, thermal noise, etc.

The discovery signal resource in which the terminal performs the D-RSSI measurement may be the discovery resource element corresponding to the discovery hopping process number and the discovery resource index specified by the upper layer.

A reference point with respect to the D-RSSI may be an antenna connector of the terminal.

Cell Discovery Signal Reception, Measurement, and Report

The macro base station may provide configuration information with respect to the discovery signals to the terminal. The configuration information may include at least one among a period and an offset of the subframe unit with respect to the discovery signal, OFDM symbol location information in the subframe, and frequency information (a resource block number). The macro base station may inform the terminal of the configuration information using the RRC signaling.

The terminal may receive the discovery signal according to the configuration information provided from the base station, and detect or measure needed information. At this time, the information detected or measured by the terminal may include at least one in the following information.

Cell index (ID) information

Cell state information (determine whether the cell is in the active state or the dormant state)

RSRP

The RSRP may be a signal strength measured using the discovery signal

RSRQ

The RSRQ may be a quality of the reception signal measured using the discovery signal and have a meaning similar to a signal-to-interference plus noise (SINR). Here, the discovery signal may be regarded as not the interference signal but a desired signal.

Interference amount by the discovery signal

The interference amount may be a quality of the reception signal obtained when the discovery signal operates as the interference signal, and have a meaning similar to the SINR. Here, the discovery signal may be regarded as the interference signal. One of methods of measuring the interference amount by the discovery signal may obtain a modified RSSI by adding the discovery signal strength to the RSSI which is previously measured, and calculate a modified RSRQ using the modified RSSI.

Reception timing offset

The reception timing offset may be a reception timing offset of the discovery signal based on a signal with respect to the macro base station.

The terminal may report information detected or measured using the discovery signal to the macro base station according to the configuration information provided from the macro base station.

Terminal Discovery Method by a Cell

The discovery method by the cell may be a method in which the terminal transmits a preamble using a physical random access channel (PRACH) and the cells confirm whether there is the terminal nearby by monitoring and detecting the preamble.

Even when the terminal discovers the cell by detecting the discovery signal, the terminal does not know a random access preamble transmission resource capable of using for accessing the discovered cell when the cell discovered by the terminal is in the dormant state. In this case, the terminal may attempt the random access with respect to the peripheral cell (the small cell or the macro cell) which is in the active state.

The small cells which are in the dormant state may confirm a presence of the terminal which is adjacent to their own by monitoring the random access channel in which the terminal transmits to the peripheral cells which are in the active state. However, according to the random access method, since the terminal controls preamble transmission power through open-loop power control with respect to the serving cell, there may be a disadvantage in which the small cells cannot determine a distance from a corresponding terminal based on the preamble reception signal.

In order to solve the problem described above, the terminal may transmit by fixing the transmission power to a specific size without using the power control when the terminal transmits the preamble. That is, the terminal may transmit the random access preamble with the transmission power of a predetermined specific size according to the configuration information of the base station so as to allow the small cells to determine the distance with the terminal. At this time, the preamble sequence used for the transmission may be one among the sequences used by the serving cell of the terminal, and the preamble index configured by the base station or the predetermined preamble index may be used. When the peripheral small cells know the preamble index information, the small cells may use the preamble index information in order to estimate the distance from the terminal.

The cells may manage by separately configuring the PRACH resource so as to allow the cells to discover the terminal. That is, the preamble transmission for the discovery may use the PRACH resource which is separately configured.

After detecting the PRACH transmitted by the terminal, the small cells may perform the following measurement, and transmit the measurement result to the macro cell or the small cells.

A magnitude of the received power of the detected PRACH

A reception timing of the detected PRACH (for example, the reception timing may be a time in which the detected PRACH is firstly received when setting a downlink subframe transmission timing of the small cell or the macro cell as a starting point)

When supposing that the terminal uses predetermined transmission power or transmission power set by a command of the macro cell, the macro cell may know a strength of a wireless link between the terminal and the small cell from the PRACH received power of the terminal measured by the small cell. Further, the macro cell may instruct the terminal to transmit the PRACH, and estimate a propagation delay with respect to the macro cell of the terminal by receiving the PRACH transmitted by the terminal. The macro cell may estimate an approximate distance between the terminal and the small cell using a value the propagation delay with respect to the macro cell of the terminal and the PRACH reception timing measurement result of the small cell, and also estimate an approximate location of the terminal.

Figure 21:
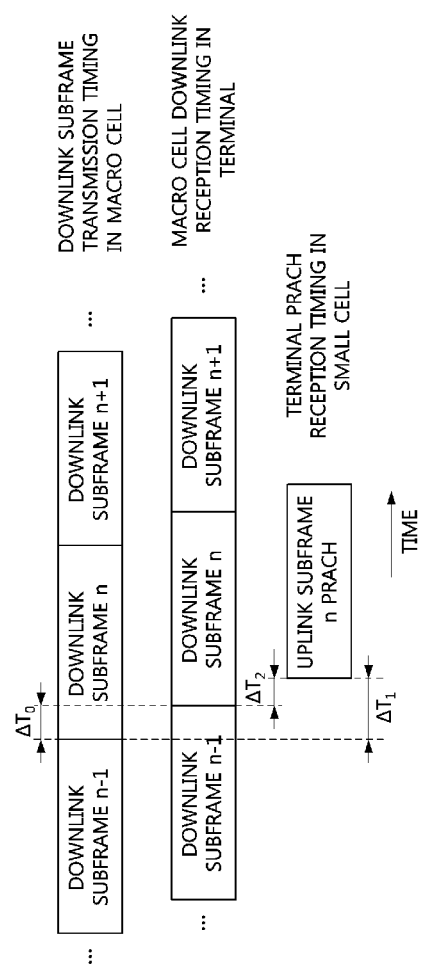
FIG. 21 is a conceptual diagram for describing a method of estimating a distance between a terminal and a small cell.

FIG. 21 is a conceptual diagram for describing a distance estimation method between a terminal and a small cell.

Referring to FIG. 21, a signal may arrive at the terminal at a time passed by $\Delta T_0$ compared with the transmission time of the macro cell due to the propagation delay, and the PRACH transmitted by the terminal may arrive at the small cell at a time passed by $\Delta T_2$ due to the propagation delay. When the downlink subframe transmission timings of the small cell and the macro cell are matched, the macro cell may estimate a value of $\Delta T_1 - \Delta T_0$ using a value of $\Delta T_2$. Even when the downlink subframe transmission timings of the small cell and the macro cell are not matched, the macro cell may estimate the value of $\Delta T_2$ when knowing a difference between the timings. The macro cell may estimate an approximate distance between the terminal and the small cell from $\Delta T_2$.

Another method in which the small cell discovers the terminal which is adjacent may use an aperiodic sounding reference signal (SRS) or a periodic SRS of the terminal. In this case, like the method of using the PRACH, the terminal may use constant transmission power without using the open-circuit power control when transmitting the SRS. Further, the terminal may transmit the SRS using the SRS sequence configured by the base station, or a predetermined SRS sequence.

The SRS resource may be the aperiodic or periodic SRS source defined in the conventional LTE standard.

The SRS resource for the terminal discovery may be separately configured and be managed. That is, the SRS transmission for the discovery may use the SRS resource which is separately configured for the discovery.

When the cell which is in the dormant state recognizes that there is the terminal nearby through the monitoring, the cell may be changed from the dormant state to the active state using this information.

When the cell which is in the active state recognizes that there is no terminal nearby through the monitoring, the cell may be changed from the active state to the dormant state.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A cell discovery method performed in a terminal, the cell discovery method, comprising:
   receiving, from a base station, a resource and sequence information including a virtual cell ID which is used for calculating a sequence for a channel state information-reference signal (CSI-RS) included in a discovery signal;
   calculating the sequence for the CSI-RS included in the discovery signal using the virtual cell ID included in the resource and sequence information;
   measuring the discovery signal using the calculated sequence; and
   reporting the measurement result of the discovery signal to the base station,
   wherein the sequence is calculated based on a following initialization equation:

$$c_{init}=2^{10}\cdot(7\cdot(n_s+1)+I+1)\cdot(2\cdot N_{ID}^{CSI}+1)+2\cdot N_{ID}^{CSI}+N_{CP},$$

$n_s$ is a slot number in a frame, I is a symbol number in a slot, $N_{ID}^{CSI}$ is the virtual cell ID, $N_{cp}$ is 0 when an extended cyclic prefix (CP) is used, and $N_{cp}$ is 1 when a normal CP is used.

2. The cell discovery method of claim 1, wherein the sequence is calculated by a following sequence equation:

$$r_{l,n_s}(m) = \frac{1}{\sqrt{2}}(1 - 2\cdot c(2m)) + j\frac{1}{\sqrt{2}}(1 - 2\cdot c(2m+1)),$$

$$m = 0, 1, \ldots, N_{RB}^{max,DL} - 1,$$

$r_{l,n_s}(m)$ is the sequence, $N_{RB}^{max,DL}$ is a maximum number of downlink resource blocks (DL RBs), and c(2m) and c(2m+1) are calculated using the $C_{init}$.

3. The cell discovery method of claim 1, wherein the discovery signal is configured based on a single antenna port.

4. The cell discovery method of claim 1, wherein the discovery signal is received through subframes for frame type 1 or 2.

5. The cell discovery method of claim 1, wherein the discovery signal is received through two resource elements for respective resource blocks.

6. The cell discovery method of claim 1, wherein the resource and sequence information indicates at least one of a transmission period of the discovery signal and resource elements to which the discovery signal is allocated.

7. The cell discovery method of claim 1, wherein the discovery signal further includes a primary discovery signal (PDS) and a secondary discovery signal (SDS), the PDS is generated based on a primary synchronization signal (PSS), and the SDS is generated based on a secondary synchronization signal (SSS).

8. The cell discovery method of claim 1, wherein the measuring of the discovery signal measures at least one of a received signal strength indicator (RSSI) of the discovery signal, a reference signal received power (RSRP) of the discovery signal, and a reference signal received quality (RSRQ) of the discovery signal.

* * * * *